No. 626,971. T. CRANEY. Patented June 13, 1899.
BRINE EVAPORATOR.
(Application filed Nov. 24, 1897.)
(No Model.)
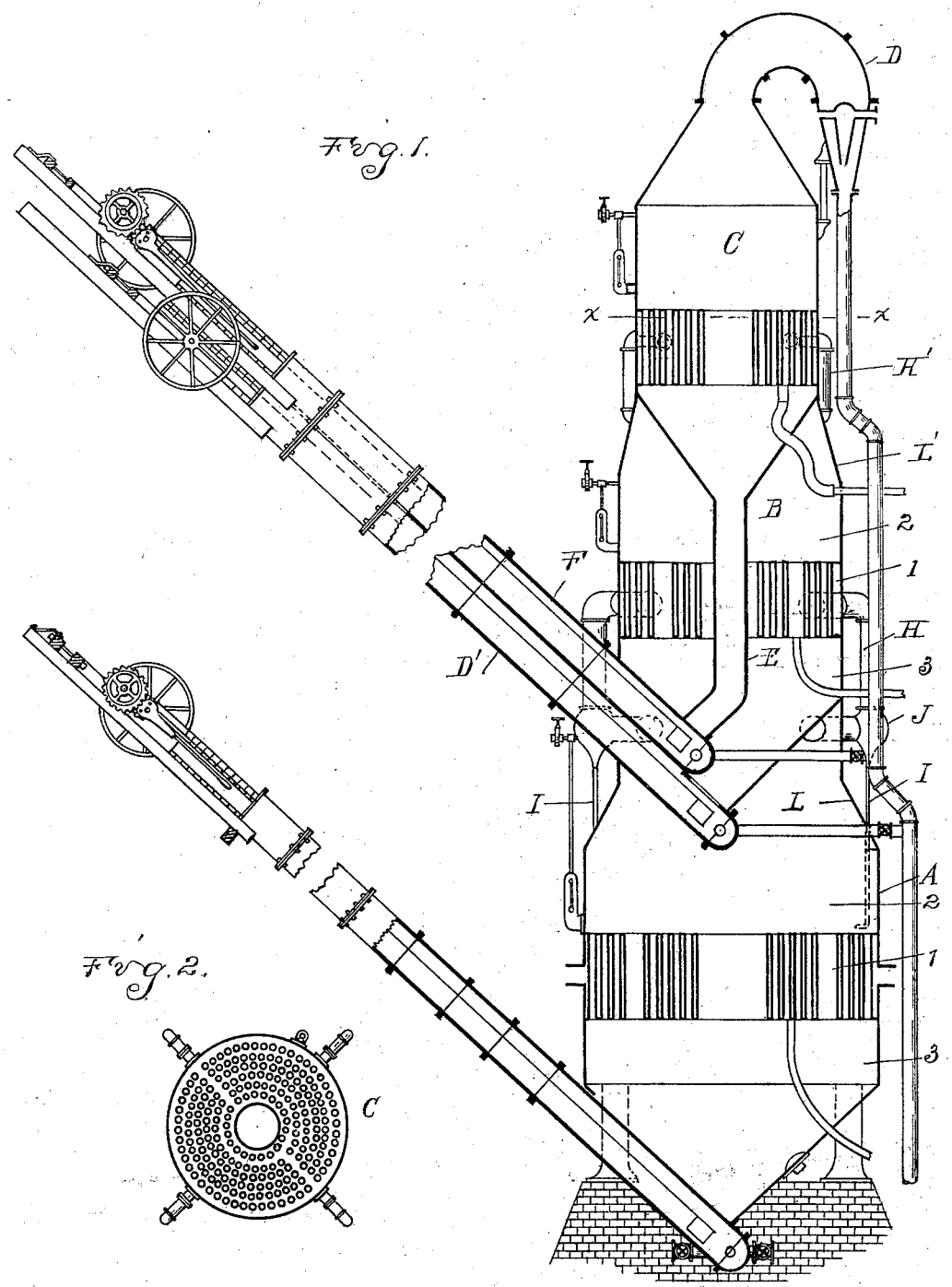

UNITED STATES PATENT OFFICE.

THOMAS CRANEY, OF BAY CITY, MICHIGAN.

BRINE-EVAPORATOR.

SPECIFICATION forming part of Letters Patent No. 626,971, dated June 13, 1899.

Application filed November 24, 1897. Serial No. 659,683. (No model.)

*To all whom it may concern:*

Be it known that I, THOMAS CRANEY, a citizen of the United States, residing at Bay City, in the county of Bay and State of Michigan, have invented certain new and useful Improvements in Evaporators, of which the following is a specification, reference being had therein to the accompanying drawings.

The invention consists in the construction of a multiple evaporating apparatus comprising superimposed pans, and particularly in the construction, arrangement, and combination of the various parts, all as more fully hereinafter described.

In the drawings, Figure 1 is a vertical central section of my improved evaporator. Fig. 2 is a cross-section on line $x\,x$, Fig. 1.

A, B, and C are three evaporating-pans arranged in vertical series. Each pan has a heating-chamber 1, (preferably supplied with steam as its heating medium,) an evaporating-chamber 2, and a settling-chamber 3. The lower pan is capped by the next higher one—that is, the bottom of the settling-chamber of pan B forms the top of the evaporating-chamber of tank A. In case the settling-chamber is hopper-shaped it will be seen that by this means a large heating-surface is formed on the superimposed pan in the evaporating-chamber of the next lower one.

The top of the pan B is formed by the bottom of the pan C. This latter pan is preferably a vacuum-pan, D being the gooseneck-discharge and vacuum-forming device.

In case but two pans are used I use the combination of pans B and C. On the bottom of the pan B, preferably in the line of one side thereof, is a conveyer D', which projects into the evaporating-chamber of the pan A. From the bottom of the pan C is a settling-leg E, passing through the pan B and engaging into the bottom of an inclined conveyer F, which is superimposed on the conveyer D'. The conveyers F and D' are, in effect, in a single casing and project together through the sides of the pans. This combining of the two conveyers reduces the cost of the apparatus greatly and also gives a large heating-surface in the leg E in the pan of lowest temperature.

It will be seen that I decrease the size of the pans from that of the highest to the lowest temperatures.

The pans may be and preferably are used with an independent fluid-supply to each; but the fluid may be fed into the upper pan and then fed into the lower pans successively. In any event the steam from the lower chamber passes into the heating-chamber of that next above. I have shown steam-supply pipes H H' for this purpose, leading, respectively, from the top of pan A into heating-chamber 1 of pan B and from pan B into heating-chamber of pan C. These pans may have "back-drip" pipes I leading back into the lower part of the pan, so that any liquid may drip back. This drip-pipe preferably leads from an expansion-chamber J.

The operation of the device is as follows: In case each pan is fed separately with a fresh supply of material to be operated on, referring to the construction shown in Fig. 1, steam from the generator is supplied into the chamber 1 of the pan C. The steam produced in the evaporating-chamber 2 surrounds and heats the lower end of the pan B and finds exit into the heating-chamber 1 of the pan B through the pipes H. It is evident that this steam will be in smaller volume and lower pressure than that which is fed into the pan A, and therefore the pan B is of correspondingly smaller size, the connection between the two pans being formed by a contracting collar L. The steam produced in the evaporating-chamber of the pan B surrounds the lower end of the pan C and heats the fluid therein and passes out through the pipes H' into the heating-chamber of the pan C. The pan C being a vacuum-pan, but a low pressure of steam is required to perfect the evaporation, which is taken off through the gooseneck and condenser D in the well-known manner. The connection between the pan B and pan C is formed by a contracting neck L'.

It will be understood without description that each of the steam-chambers is necessarily provided with drip-pipes for carrying off the water of condensation.

What I claim as my invention is—

1. In an evaporating apparatus, a vacuum-pan, a lower pan on which the vacuum-pan is seated and for which it forms the top, a heating apparatus for the lower pan, a connection from the upper portion of the lower pan to the lower portion of the vacuum-pan, a settling-leg for the vacuum-pan extending into the lower pan, and a double conveyer, one connecting with said settling-leg and the other with the lower pan at the base of the latter.

2. In an evaporating apparatus, the combination of a series of superimposed evaporating-pans, a vapor-pipe leading from the upper portion of each evaporating-pan into the central portion of the pan, next above, conveyers for the lower portions of the several pans and a condenser communicating only with the upper portion of the topmost pan.

3. In an evaporating apparatus, the combination, of an evaporating-pan, a heating apparatus therefor, a second evaporating-pan above the first-mentioned evaporating-pan, a settling-leg for the upper evaporating-pan extending down into the lower evaporating-pan, and conveying means for said settling-leg and lower evaporating-pan.

In testimony whereof I affix my signature in presence of two witnesses.

THOMAS CRANEY.

Witnesses:
JAMES WHITTEMORE,
M. B. O'DOGHERTY.